(12) United States Patent
McCoy et al.

(10) Patent No.: US 10,275,139 B2
(45) Date of Patent: Apr. 30, 2019

(54) SYSTEM AND METHOD FOR INTEGRATED USER INTERFACE FOR ELECTRONIC DEVICES

(71) Applicants: SONY CORPORATION, Tokyo (JP); SONY NETWORK ENTERTAINMENT INTERNATIONAL LLC, Los Angeles, CA (US)

(72) Inventors: Charles McCoy, Coronado, CA (US); True Xiong, San Diego, CA (US); Francis Van Aeken, San Diego, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 393 days.

(21) Appl. No.: 14/489,791

(22) Filed: Sep. 18, 2014

(65) Prior Publication Data
US 2016/0087853 A1    Mar. 24, 2016

(51) Int. Cl.
*G06F 3/0481* (2013.01)
*G06F 3/0482* (2013.01)
(Continued)

(52) U.S. Cl.
CPC ........ *G06F 3/04847* (2013.01); *G06F 3/0482* (2013.01); *G06F 3/04842* (2013.01);
(Continued)

(58) Field of Classification Search
CPC ....... H04L 41/22; H04L 41/12; H04L 41/145; H04L 29/06; H04L 29/08072; H04L 29/0899; G05B 2219/23258; G05B 2219/2642; G05B 2219/2615; G05B 2219/23377; G05B 2219/25168; G05B 19/0426; G11B 27/034; G01C 21/367; H04N 21/4622; H04N 21/47; H04N 21/4331; H04N 21/4532; H04N 5/4401;
(Continued)

(56) References Cited

U.S. PATENT DOCUMENTS

| 6,130,757 | A | * | 10/2000 | Yoshida | H04N 1/00915 358/1.14 |
| 7,089,499 | B2 | | 8/2006 | Steichen et al. | |
| 8,327,037 | B2 | * | 12/2012 | Suzuki | H04N 1/00411 710/33 |
| 8,544,147 | B2 | | 10/2013 | Paku et al. | |
| 6,597,374 | B1 | | 7/2003 | Baker et al. | |

(Continued)

OTHER PUBLICATIONS

Universal Electronics, "UEI QuickSet", (http://phx.corporate-ir.net/External.File?item=UGFyZW50SUQ9MTQwOTE3fENoaWxkSUQ9LTF8VHIwZT0z&t=1), Jun. 9, 2011.

*Primary Examiner* — Shourjo Dasgupta
(74) *Attorney, Agent, or Firm* — Chip Law Group (57) ABSTRACT

Various aspects of a system and a method for integrated user interface for electronic devices are disclosed. The system may include a first electronic device. The first electronic device receives metadata from a second electronic device. The first electronic device generates an integrated user interface (UI) corresponding to the first electronic device and the second electronic device based on received metadata. The received metadata comprises a current set of available operations for controlling the first and/or second electronic device. The first electronic device renders the generated integrated UI on a display of the first electronic device.

20 Claims, 5 Drawing Sheets

(51) Int. Cl.

| | |
|---|---|
| *G06F 3/0484* | (2013.01) |
| *G06F 3/01* | (2006.01) |
| *G06F 17/30* | (2006.01) |
| *H04L 29/06* | (2006.01) |
| *H04L 29/08* | (2006.01) |
| *G06Q 10/10* | (2012.01) |
| *G06Q 30/02* | (2012.01) |
| *H04N 7/173* | (2011.01) |
| *H04N 5/44* | (2011.01) |
| *H04N 5/45* | (2011.01) |
| *H04N 5/445* | (2011.01) |
| *G06F 9/451* | (2018.01) |
| *G06F 9/44* | (2018.01) |

(52) U.S. Cl.
CPC ............ *G06F 9/4443* (2013.01); *G06F 9/451* (2018.02); *H04L 67/025* (2013.01)

(58) Field of Classification Search
CPC .. H04N 5/44543; H04N 5/45; H04N 7/17318; G06F 3/04842; G06F 3/0481; G06F 3/04895; G06F 3/1454; G06F 3/011; G06F 3/016; G06F 3/0482; G06F 3/04847; G06F 1/1626; G06F 1/163; G06F 8/65; G06F 8/38; G06F 8/34; G06F 9/4446; G06F 9/4443
USPC ........ 715/705, 714, 716–718, 733–735, 737, 715/740, 744–745, 747, 764, 771
See application file for complete search history.

(56) References Cited

U.S. PATENT DOCUMENTS

| | | | | |
|---|---|---|---|---|
| 8,872,765 | B2* | 10/2014 | Higuchi | G05B 19/02 345/156 |
| 2002/0194596 | A1* | 12/2002 | Srivastava | H04B 1/205 725/37 |
| 2003/0090515 | A1 | 5/2003 | Chang et al. | |
| 2008/0256495 | A1 | 10/2008 | Antos et al. | |
| 2009/0150814 | A1 | 6/2009 | Eyer et al. | |
| 2009/0210932 | A1* | 8/2009 | Balakrishnan | H04W 4/02 726/5 |
| 2009/0322714 | A1* | 12/2009 | Lee | H04N 5/45 345/204 |
| 2009/0326684 | A1* | 12/2009 | Wang | H04L 12/2809 700/83 |
| 2011/0131479 | A1* | 6/2011 | Padgett | G06F 3/04895 715/223 |
| 2011/0179104 | A1* | 7/2011 | Hakoda | G11B 27/034 709/203 |
| 2013/0154810 | A1 | 6/2013 | Ferren | |
| 2013/0283183 | A1 | 10/2013 | Knight et al. | |
| 2013/0290858 | A1* | 10/2013 | Beveridge | G06F 3/0484 715/740 |
| 2014/0133694 | A1* | 5/2014 | Mishra | G08C 17/02 382/100 |
| 2014/0222862 | A1* | 8/2014 | Arling | G06F 17/30477 707/769 |
| 2014/0337879 | A1* | 11/2014 | Arling | H04N 21/812 725/32 |
| 2015/0370461 | A1* | 12/2015 | Zhang | G06F 3/04817 715/716 |

* cited by examiner

SYSTEM AND METHOD FOR INTEGRATED USER INTERFACE FOR ELECTRONIC DEVICES

FIELD

Various embodiments of the disclosure relate to user interface for electronic devices. More specifically, various embodiments of the disclosure relate to integrated user interface (UI) for electronic devices.

BACKGROUND

With growing needs of users, the consumer electronic appliance market has seen an increase in types of electronic devices made available. A typical home environment now includes a number of electronic devices and consumer appliances for different functions. Such electronic devices may be connected to each other in a home network.

A user may operate more than one electronic device at a single point in time. However, each of the electronic devices may have an individual remote control to control an operation of the respective electronic device. In certain scenarios, the remote control of a television may include dedicated button(s) to control one or more operations of another device other than the television. Nevertheless, such a remote control may not be indicative of the features and/or functionalities of the other device.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method are provided for an integrated user interface (UI) for electronic devices substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various implementations may be found in a system and method for integrated user interface (UI) for one or more electronic devices. Exemplary aspects of the disclosure may comprise a method implemented in an electronic device of the one or more electronic devices. The electronic device may receive metadata from the one or more electronic devices. The electronic device may generate an integrated user interface that corresponds to the one or more electronic devices based on the received metadata. The received metadata may comprise a current set of available operations for controlling the one or more electronic devices.

In an embodiment, the electronic device may render the integrated user interface on a display of the electronic device. In an embodiment, the integrated user interface comprises a set of user interface (UI) elements corresponding to one or more other electronic devices based on the received metadata. In an embodiment, the electronic device may control a feature associated with the current set of available operations of the one or more electronic devices, via the rendered integrated user interface. In an embodiment, the rendered integrated user interface comprises one or more user interfaces corresponding to the one or more electronic devices. The one or more user interfaces comprises a set of UI elements corresponding to the one or more electronic devices.

In an embodiment, the rendered integrated user interface comprises a first user interface that corresponds to the electronic device and one or more second user interfaces that correspond to one or more other electronic devices. The first user interface may comprise a first set of UI elements that correspond to the electronic device. The one or more second user interfaces may comprise a second set of UI elements that correspond to one or more other electronic devices. In an embodiment, the rendered integrated user interface that corresponds to the one or more electronic devices may comprise an integrated set of UI elements. The integrated set of UI elements may comprise a first portion of the first set of UI elements and a second portion of the second set of UI elements.

In an embodiment, the integrated set of UI elements may be selected based on a first set of features of the one of the one or more electronic devices and a second set of features of the one or more electronic devices. The first set of features of the electronic device may correspond to a hardware capability and/or a software capability of the electronic device. The second set of features may correspond to a hardware capability and/or a software capability of one or more other electronic devices.

In an embodiment, the integrated set of UI elements may be dynamically updated based on one or more user preferences and/or an historical usage of the integrated set of UI elements. In an embodiment, the user preferences may comprise one or more of at least one feature of the first set of features, at least one feature of the second set of features, at least one UI element of the first set of UI elements, and/or at least one UI element of the second set of UI elements. In an embodiment, the historical usage of the integrated set of UI elements may comprise one or more frequently used UI elements of the integrated set of UI elements over a period of time.

In an embodiment, the metadata may comprise one or more of the second portion of the second set of UI elements, the second set of features corresponding to the one or more electronic devices, current settings of the one or more electronic devices, one or more operating conditions of the one or more electronic devices, the user preferences, and/or the historical usage of the integrated set of UI elements. The one or more electronic devices may be operable to communicate with the one or more electronic devices via a communication network. In an embodiment, the one or more electronic devices may be operable to dynamically update the integrated user interface, based on a connection status of each of the one or more electronic devices in the communication network.

Figure 1:
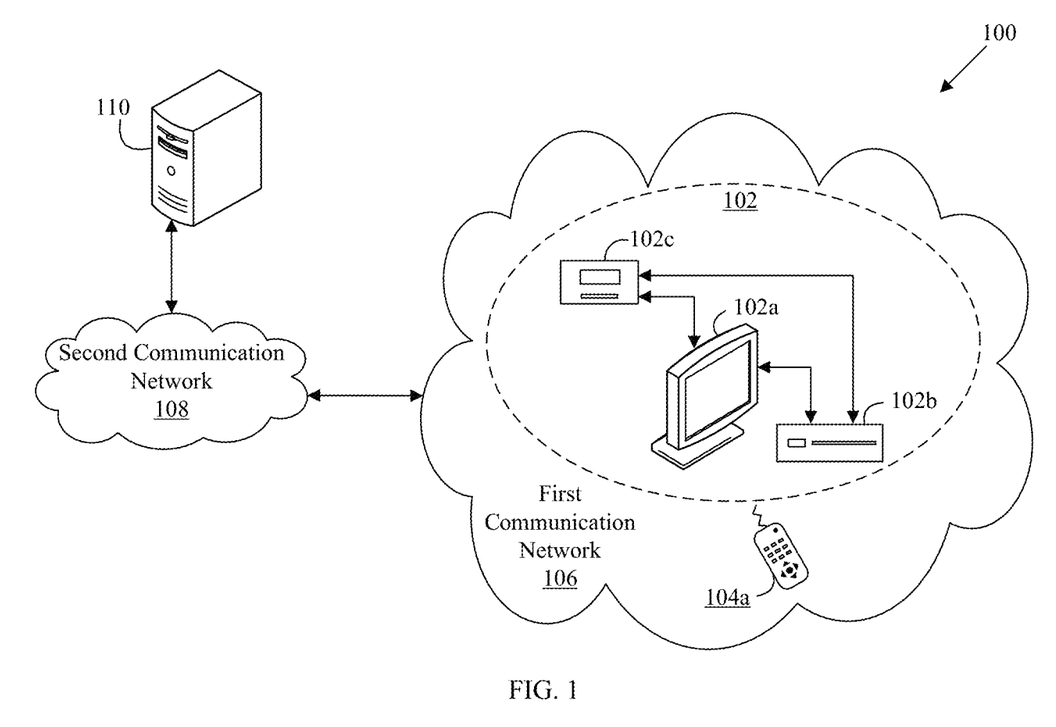
FIG. 1 is a block diagram illustrating a network environment for an integrated user interface (UI) for electronic devices, in accordance with an embodiment of the disclosure.

FIG. 1 is a block diagram illustrating a network environment 100 for integrated UI for electronic devices, in accordance with an embodiment of the disclosure. The network environment 100 may comprise one or more electronic devices 102, such as a first electronic device 102a, a second electronic device 102b, and a third electronic device 102c. The network environment 100 may further comprise a first remote controller 104a, a first communication network 106, a second communication network 108, and a server 110.

The first electronic device 102a may comprise suitable logic, circuitry, interfaces, and/or code that may enable communication with the second electronic device 102b, the third electronic device 102c, and/or the server 110. In an embodiment, the first electronic device 102a may be operable to communicate directly with the second electronic device 102b and the third electronic device 102c, via the first communication network 106. In an embodiment, the first electronic device 102a may be operable to communicate with the second electronic device 102b and the third electronic device 102c, via the server 110 over the second communication network 108. Examples of the first electronic device 102a, the second electronic device 102b, and/or the third electronic device 102c may include a television, a laptop, a tablet computer, a set-top box (STB), a video display, a personal digital assistant (PDA) device, a Blu-ray Disc™ player, a home theater receiver, a refrigerator, an air conditioner, a mobile device, a smartphone, a lamp, a wearable device, such as a smart watch, a wearable sensor, or a wristband, an augmented reality device and/or the like.

The second electronic device 102b may comprise suitable logic, circuitry, interfaces, and/or code that may enable communication with the first electronic device 102a and/or the third electronic device 102c. The second electronic device 102b may communicate via the first communication network 106 and/or the server 110. In an embodiment, the second electronic device 102b may connect directly to the first electronic device 102a, via an external port provided on the first electronic device 102a. In an embodiment, the second electronic device 102b may not have a display and may utilize a display of the first electronic device 102a. For instance, the first electronic device 102a may be a display device, such as television, and the second electronic device 102b may be an encoding/decoding device, such as a Blu-ray Disc™ player. In such a case, the Blu-ray Disc™ player may transmit content to the television, over the first communication network 106, and/or via the server 110. The content may include audio/video content of the Blu-ray Disc™ player that may be decoded to render on a display of the television. In an embodiment, the one or more electronic devices 102 may transmit content to each other through wired cables without using the first communication network 106. The one or more electronic devices 102 may communicate with each other through wired communication, such as a Universal Synchronous Bus (USB), a High-Definition Multimedia Interface (HDMI), and/or a Peripheral Component Interconnect (PCI), and the like.

The third electronic device 102c may comprise suitable logic, circuitry, interfaces, and/or code that may enable communication with the first electronic device 102a, and/or the second electronic device 102b, via the first communication network 106 and/or the server 110. In an embodiment, the third electronic device 102c may not include a display. In such a case, the third electronic device 102c may utilize a display of the first electronic device 102a. In an embodiment, the third electronic device 102c, such as a mobile device, may have a display.

The first remote controller 104a may comprise suitable logic, circuitry, interfaces, and/or code that may be operable to communicate with the first electronic device 102a. The first remote controller 104a may transmit a plurality of input signals to control the playback of the content rendered on the first electronic device 102a. In an embodiment, the first remote controller 104a may communicate with the first electronic device 102a, via wireless communication protocols. Examples of the first remote controller 104a may include, but are not limited to, an infrared remote controller, a keyboard, a mouse, a joystick, a gamepad, a paddle, a trackball, and/or a touch screen device.

In an embodiment, the first electronic device 102a may remotely communicate with the first remote controller 104a, via a wired connection or short-range communication, such as infrared communication. In an embodiment, button(s) on the first remote controller 104a may be associated with one or more functions of the first electronic device 102a. In an embodiment, all the functions of the first electronic device 102a may be controlled on the first remote controller 104a. In an embodiment, when a user presses button(s) on the first remote controller 104a, the first electronic device 102a responds to the received signal (via wireless communication) by executing the function associated with the input from the first remote controller 104a. Examples of the one or more functions may include, but are not limited to, switching channels, increasing/decreasing volume, selecting one or more icons on the user interface (UI), switching between multiple screens on UI, playing an audio/video file, pausing an audio/video file, and/or stop playing an audio/video file.

The second remote controller (not shown) may comprise suitable logic, circuitry, interfaces, and/or code that may be operable to communicate with the second electronic device 102b. The second remote controller may be similar in functionality to the first remote controller 104a. The layout of the first remote controller 104a and the second remote controller 104b may depend on one or more features of the first electronic device 102a and the second electronic device 102b, respectively. Examples of the one or more features may include, but are not limited to, hardware and/or software capabilities based on a type of electronic device, one or more third-party service accounts associated with a user of the electronic device, content such as movies being stored on a memory of the electronic device, and/or the like.

The first communication network 106 may comprise a medium through which the first electronic device 102a, the second electronic device 102b, and/or the third electronic device 102c, may communicate with each other. Examples of the first communication network 106 may include short range networks, such as a home network, a Wireless Fidelity (Wi-Fi) network, an adhoc wireless network, a Local Area Network (LAN), and/or the like. Various pluralities of electronic devices, such as one or more of electronic devices 102 in the network environment 100, may be operable to connect to the first communication network 106, in accordance with various wired and wireless communication protocols known in the art. Examples of wireless communication protocols may include, but are not limited to, Bluetooth (BT) communication protocols or Near-field communication (NFC). In an embodiment, the first communication network 106 may be implemented through one or more HDMI cables, proprietary consumer electronics networking cables, and/or USB cables between the one or more electronic devices 102.

The second communication network 108 may comprise a medium through which the first electronic device 102a, the second electronic device 102b, and/or the third electronic device 102c, may communicate with each other and/or with the server 110. Examples of the second communication network 108 may include the Internet, a Metropolitan Area Network (MAN), and/or the like. Various devices in the network environment 100 may be operable to connect to the second communication network 108, in accordance with various wired and wireless communication protocols. Examples of wired or wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

The server 110 may comprise suitable logic, circuitry, interfaces, and/or code that may be operable to communicate with the first electronic device 102a, the second electronic device 102b, the third electronic device 102c, and/or other electronic devices in the communication network 106. In an embodiment, the server 110 may be operable to select one of the one or more electronic devices 102 that communicates with the server 110, as a rendering device, based on one or more features of the one or more electronic devices 102. In an embodiment, the server 110 is an optional device and may not be included in the network environment 100.

In operation, the first electronic device 102a may receive metadata from the second electronic device 102b and/or the third electronic device 102c. In an embodiment, the first electronic device 102a may generate an integrated UI that corresponds to the second electronic device 102b and/or the third electronic device 102c, based on the received metadata. In an embodiment, the server 110 may be operable to generate an integrated (or unified) interface for content received from at least one of the first electronic device 102a, the second electronic device 102b, the third electronic device 102c, and/or other electronic devices that communicate with the server 110.

In an embodiment, the received metadata may comprise a current set of available operations to control the second electronic device 102b and/or the third electronic device 102c. In an embodiment, the generated integrated UI may be rendered on a display of the first electronic device 102a. In an embodiment, the integrated UI may comprise a set of UI elements corresponding to the second electronic device 102b and/or the third electronic device 102c. In an embodiment, the first electronic device 102a may render the UI of the second electronic device 102b and/or the third electronic device 102c as a portion of the UI of the first electronic device 102a. Examples of the metadata received from the second electronic device 102b and/or the third electronic device 102c may include, but are not limited to, information regarding stored content, information regarding subscription to online content and services, information regarding content available through the online services, settings, applications, images, audio files, videos, themes, playable demos, movie trailers, movies, games, add-on content, information regarding stored content, information regarding subscription to online content and services, and/or information regarding content available through the online services. In an embodiment, content associated with a user account based on subscription to one or more online services, may be utilized as metadata. In an embodiment, the metadata may comprise one or more of the second portion of the second set of UI elements, the second set of features corresponding to the second electronic device 102b and/or the third electronic device 102c, current settings of the second electronic device 102b and/or the third electronic device 102c, one or more operating conditions of the second electronic device 102b and/or the third electronic device 102c, the user preferences, and/or the historical usage of the integrated set of UI elements.

In an embodiment, the rendered integrated UI may comprise one or more user interfaces corresponding to the second electronic device 102 and/or the third electronic device 102c. The one or more user interfaces may comprise a set of UI elements corresponding to the second electronic device 102 and/or the third electronic device 102c. In an embodiment, a first UI that corresponds to the first electronic device 102a may comprise a first set of UI elements. One or more second UI's that correspond to the second electronic device 102b and/or the third electronic device 102c may comprise a second set of UI elements. In an embodiment, the integrated UI that corresponds to the first electronic device 102a, and the second electronic device 102b and/or the third electronic device 102c, may comprise an integrated set of UI elements. The integrated set of UI elements may comprise a first portion of the first set of UI elements and a second portion of the second set of UI elements.

In an embodiment, the integrated UI may include UI elements directed to input control, navigation, information and/or the like. UI elements related to input control may include, but are not limited to, menu items, buttons, radio buttons, dropdown buttons, checkboxes, dropdown/select lists, list boxes, toggles, text fields, and date and/or time picker. UI elements related to navigation may include, but are not limited to, sliders, images and/or icons, dials, search fields, breadcrumb, pagination, or tags. UI elements related to information may include, but are not limited to, message boxes/windows, tool tips, progress bars, notification elements, pop-up windows, or other modal windows. In an embodiment, UI elements to be displayed on one or more electronic devices 102 may include information pertaining to ordering and/or layout of UI elements on a display of one or more electronic devices 102. In an embodiment, the UI elements may include information related to physical appearance of one or more UI elements, such as sizing and/or colors. In an embodiment, the integrated UI including one or more of such UI elements may style UI elements from one or more electronic devices 102 to have a similar appearance such that these UI elements appear to be a part of a single UI.

In an embodiment, the integrated UI for the one or more electronic devices 102 may display status information regarding the one or more electronic devices 102, such as time elapsed/remaining in content being played, alerts, or remaining battery power level.

In an embodiment, the integrated set of UI elements may be selected, based on a first set of features of the first electronic device 102a, and a second set of features of the second electronic device 102b and/or the third electronic device 102c. In an embodiment, the first set of features of the first electronic device 102a may correspond to a hardware capability and/or a software capability of the first electronic device 102a. The second set of features of the second electronic device 102b and/or the third electronic device 102c may correspond to a hardware capability and/or a software capability of the second electronic device 102b and/or the third electronic device 102c. For example, the first electronic device 102a may be a television and the second electronic device 102b may be a game console. The television may display the one or more UI elements of the game console based on display features available on the game console. The display features, such as brightness, contrast, color enhancement, or color adjustment, may be controlled by the first remote controller 104a.

In an embodiment, the integrated set of UI elements may be dynamically updated, based on one or more of user preferences and/or a historical usage of the integrated set of UI elements. In an embodiment, the user preferences may comprise one or more of at least one feature of the first set of features, at least one feature of the second set of features, at least one UI element of the first set of UI elements, and/or at least one UI element of the second set of UI elements.

In an embodiment, the historical usage of the integrated set of UI elements may comprise one or more frequently used UI elements of the integrated set of UI elements. In an embodiment, based on the frequently used UI elements, the first electronic device 102a rendering to the UI, may adjust the placement and layout of the one or more UI elements on the integrated UI. In an embodiment, a history of actions of a plurality of users associated with the one or more electronic devices 102, may be stored by an electronic device, such as the first electronic device 102a and/or server, such as the server 110. The first electronic device 102a and/or the server 110, may analyze the stored history to generate the integrated UI.

In an embodiment, the first electronic device 102a may control a feature of the second electronic device 102b and/or the third electronic device 102c, via the integrated user interface. In an embodiment, the first electronic device 102a may communicate with the second electronic device 102b, and/or a third electronic device 102c, via the first communication network 106. The first communication network 106 may comprise one of a peer-to-peer network, ad hoc network, and/or client-server based network. In an embodiment, the first communication network 106 may be a peer-to-peer network that may use various peer-to-peer protocols, such as Direct Connect.

In an embodiment, the first electronic device 102a may dynamically update the integrated UI, based on a connection status of the second electronic device 102b, and the third electronic device 102c, in the first communication network 106. In an embodiment, the first electronic device 102a may include one or more docks and/or ports to enable a connection to the one or more electronic devices 102, such as the second electronic device 102b and/or the third electronic device 102c. In an embodiment, the first electronic device 102a may be connected to the second electronic device 102b, and/or the third electronic device 102c, via a wireless network.

In an embodiment, an area of the integrated UI may be driven by an active UI element from one of the one or more electronic devices 102, such as Hyper-text Markup Language (HTML) rendered by a browser, a Java applet, a Flash application, or images rendered by one of the one or more electronic devices 102 being controlled. In an embodiment, when the integrated UI displays an image from one of the one or more electronic devices 102, i.e. the controlled device being controlled as a part of the integrated UI, any interactions with that image, such as touches, mouse-clicks, or typed text, may be directed to the controlled device. In such a case, one or more responses/actions or interactions of the controlled device may modify the image that is being displayed on the integrated UI.

In an embodiment, the one or more electronic devices 102 may be connected to each other directly, or via the first communication network 106. In an embodiment, the one or more electronic devices 102 may be connected via the first communication network 106. The first communication network 106 may be a home network. Each of the one or more electronic devices 102 may interact with other electronic devices in the home network via the first communication network 106. Such a home network may be established using wired and/or wireless technologies known in the art. For the sake of brevity, the one or more electronic devices 102 comprising three electronic devices, the first electronic device 102a, the second electronic device 102b, and the third electronic device 102c, are shown in FIG. 1. However, without departing from the scope of the disclosed embodiments, there may be more than three electronic devices in the one or more electronic devices 102 that communicate with each other directly, or via the server 110.

In an embodiment, the first electronic device 102a may execute a plurality of program codes that may be stored on a removable medium, and/or disk. In an embodiment, the first electronic device 102a may receive an electrical signal via a wired cable, such as a USB cable, an HDMI cable, and/or a PCI.

In an embodiment, the first electronic device 102a, the second electronic device 102b, and the third electronic device 102c, may be remotely located with respect to each other. In an embodiment, the first electronic device 102a, the second electronic device 102b, and the third electronic device 102c, may exchange information with the server 110 and/or with each other, via the second communication network 108.

In an embodiment, the server 110 may receive content from one or more electronic devices 102 that communicate with the server 110. In an embodiment, the server 110 may generate an integrated interface to display content in a unified manner, from the one or more electronic devices 102. In such a case, a user does not need to know the source of the content they are interested in watching. The user may send an inquiry to the integrated interface regarding content of interest by use button(s) on the first remote controller 104a. In response, the server 110 may check availability of requested content from a repository of content that is stored on or received from the one or more electronic devices 102. Examples of content may include, but are not limited to, settings, user interfaces, functions, movies, video files, audio files, third party services, and/or messages. In an embodiment, the functionality or the role of the server 110, may be executed by the first electronic device 102a, the second electronic device 102b, the third electronic device 102c, and/or other electronic devices connected to the first communication network 106.

In an embodiment, the server 110 may be operable to generate the integrated UI by the integration of content available on the second electronic device 102b, and the third electronic device 102c. The integrated content may have the look and feel of a unified interface of the first electronic device 102a. In an embodiment, the server 110 may determine the look and feel of the integrated UI, based on the content received from the first electronic device 102a, the second electronic device 102b, and/or the third electronic device 102c. In such a case, the look and feel of the unified interface may correspond to a look and feel of either of the electronic devices that communicate with the server 110. For example, the look and feel of the unified interface may correspond to one of the first electronic device 102a, the second electronic device 102b, or the third electronic device 102c. In an embodiment, the server 110 may determine the look and feel of the integrated UI, based on where the integrated UI is being displayed.

In an embodiment, a layout and/or the look and feel of the generated integrated UI may be a combination of the user interfaces of the one or more electronic devices 102 communicating with the server 110. In such a scenario, to optimize integration, the server 110 may adopt one or more features of the UI of each of the one or more electronic devices 102. In an embodiment, the server 110 may generate an integrated UI independent of the look and feel of respective user interfaces of the first electronic device 102a, the second electronic device 102b, and/or the third electronic device 102c.

In an embodiment, the integrated UI may be a graphical user interface (GUI). The GUI may include one or more graphical icons to interact with a user of each of the one or more electronic devices 102. In an embodiment, the integrated UI may be a text-based user interface (TUI). The TUI may include text-based data, symbols and colors in a given text environment to interact with a user of each of the one or more electronic devices 102.

Figure 2:
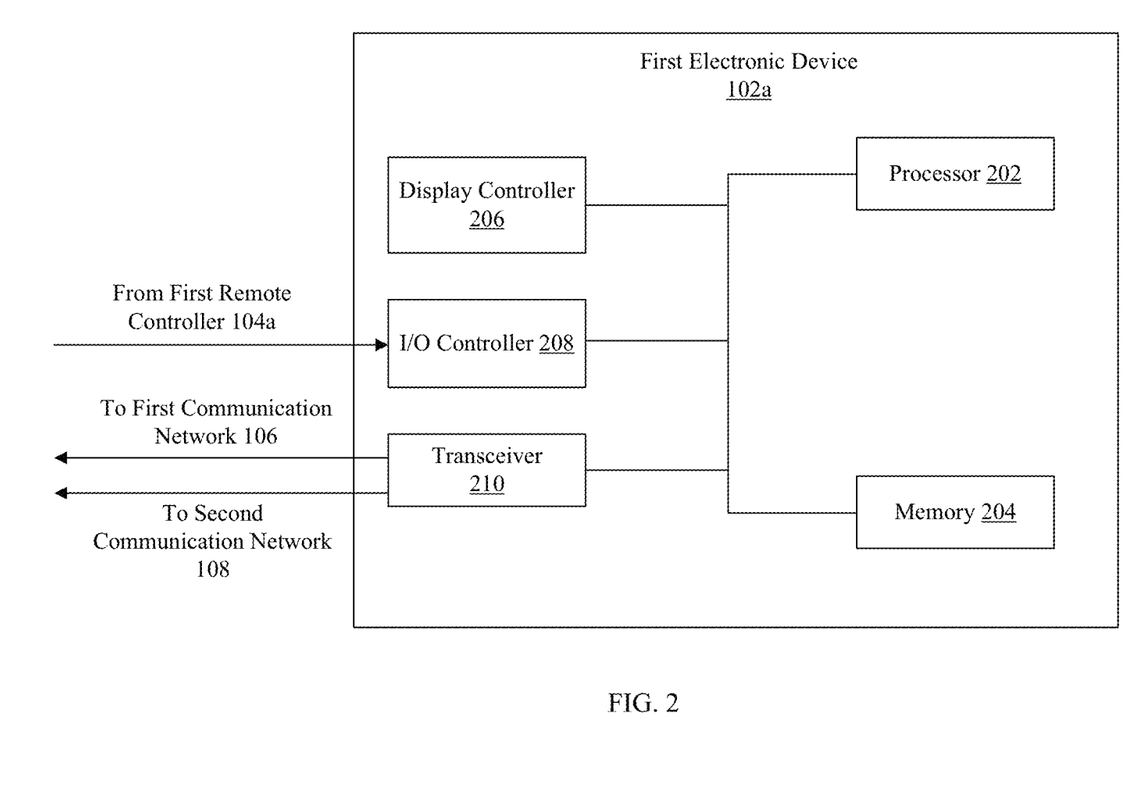
FIG. 2 is a block diagram illustrating a computing device for integrated UI for electronic devices, in accordance with an embodiment of the disclosure.

FIG. 2 is a block diagram illustrating an exemplary computing device for an integrated UI, in accordance with an embodiment of the disclosure. FIG. 2 is explained in conjunction with elements from FIG. 1. With reference to FIG. 2, there is shown a first electronic device 102a. The first electronic device 102a may comprise one or more processors, such as a processor 202, a memory 204, a display controller 206, an input/output (I/O) controller 208, and a transceiver 210.

The processor 202 may be communicatively coupled to the memory 204, display controller 206, the I/O controller 208, and the transceiver 210. The processor 202 may comprise suitable logic, circuitry, interfaces, and/or code that may be operable to execute a set of instructions stored in the memory 204. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processor.

The memory 204 may comprise suitable logic, circuitry, interfaces, and/or code that may be operable to store the received set of instructions. The memory 204 may store a plurality of multimedia content that the processor 202 may display on the first electronic device 102a. The memory 204 may be communicatively coupled with a secondary storage device, such as a hard disk or external storage device (such as a compact disc (CD)). Such a communicative coupling may enable the memory 204 to buffer multimedia content retrieved from the secondary storage device or the external storage device. The memory 204 may be implemented by the use of various multimedia database management systems that are well known to those skilled in the art. The memory 204 may be implemented based on, but not limited to, a Random Access Memory (RAM), a Read-Only Memory (ROM), a Hard Disk Drive (HDD), a storage server and/or a Secure Digital (SD) card. In an embodiment, the memory 204 may be flash memory implemented in memory cards, solid-state drives, USB flash drives, and/or the like. In an embodiment, the memory 204 may be directly attached to a printed circuit board (PCB) of the one or more electronic devices 102 through one or more interfaces, such as USB cable, HDMI cable, and/or PCI.

The display controller 206 may be operable to control one or more display devices, such as the first electronic device 102a. The display controller 206 may comprise suitable logic, circuitry, interfaces, and/or code that may be operable to generate audio and/or video signals for content being rendered on the first electronic device 102a. In an embodiment, the display controller 206 may be a graphics-card and/or a graphics processing unit (GPU).

The I/O controller 208 may be operable to control one or more (I/O) devices. The I/O controller 208 may comprise various interfaces between the I/O devices and the processor 202. In an embodiment, the I/O controller 208 may be an add-on software or hardware, which allows connection of additional I/O devices to the first electronic device 102a. The I/O controller 208 may be connected to a plurality of I/O devices. In an embodiment, the first remote controller 104a may communicate with the first electronic device 102a, via I/O controller 208. Examples of the input devices may include, but are not limited to, the first remote controller 104a, a keyboard, a mouse, a joystick, a touch screen, a microphone, and/or a camera. Examples of the output devices may include, but are not limited to, the first electronic device 102a and a speaker.

The transceiver 210 may be coupled to the first communication network 106 and the second communication network 108. The transceiver 210 may comprise suitable logic, circuitry, interfaces, and/or code that may be operable to communicate with the server 110, via various communication interfaces. The transceiver 210 may implement known technologies for supporting wired or wireless communication with the first communication network 106, and the second communication network 108. Examples of the transceiver 210 may include, but are not limited to, an antenna, a radio frequency (RF) transceiver, one or more amplifiers, a tuner, one or more oscillators, a digital signal processor (DSP), a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use a plurality of communication standards, protocols and technologies including, but not limited to, Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the processor 202 may be operable to receive metadata from the second electronic device 102b. In an embodiment, the processor 202 may generate an integrated UI that corresponds to the first electronic device 102a, and the second electronic device 102b, based on the received metadata. In an embodiment, the processor 202 may render the generated integrated UI on a display of the first electronic device 102a. In an embodiment, the processor 202 may receive metadata and/or content directly from the second electronic device 102b, and/or the third electronic device 102c, via the first communication network 106. In an embodiment, the first electronic device 102a may receive metadata from the one or more electronic devices 102 that communicate through the server 110, via the second communication network 108. The received metadata may comprise a current set of available operations for controlling the second electronic device 102b. In an embodiment, the current set of available operations of the second electronic device 102b may be a portion of menu items of a UI of the second electronic device 102b.

In an embodiment, the first remote controller 104a may provide one or more signals to command the first electronic device 102a, to control playback of content being rendered on a display of the first electronic device 102a. The instructions may be generated based on a selection of alphanumeric characters or pressing of a pre-specified button on the first remote controller 104a. In an embodiment, the processor 202 may be operable to execute commands to retrieve content, applications, and/or other resources available from third-party services, such as a video on demand service, photo-editing service, and/or the like.

Figure 3:
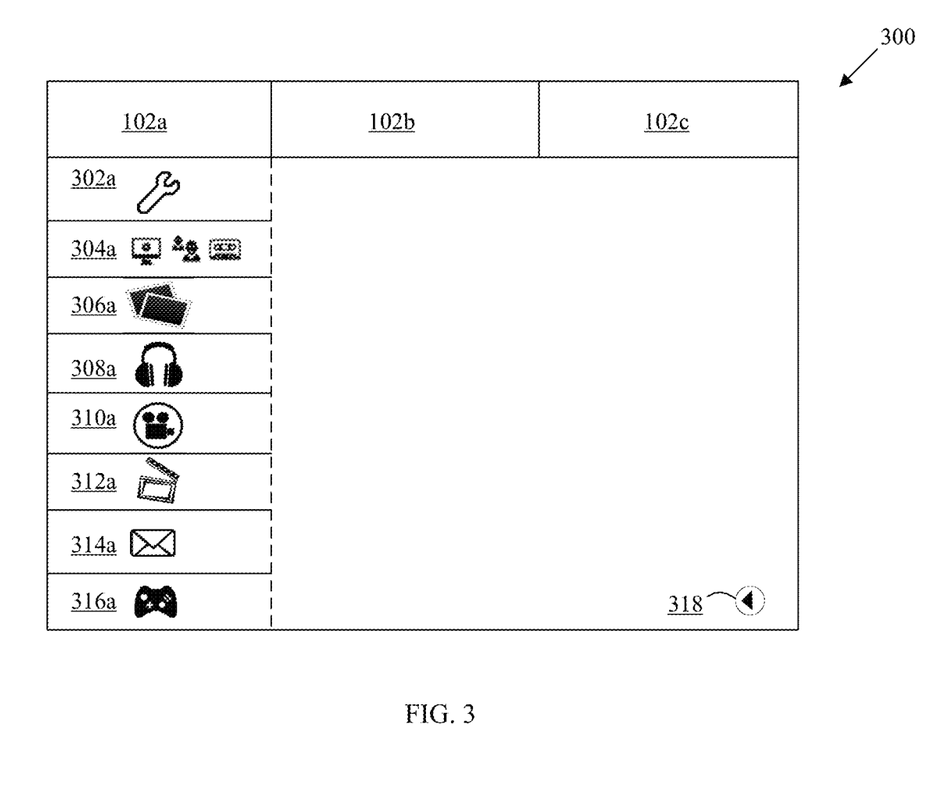
FIG. 3 is a diagram illustrating an exemplary integrated UI for electronic devices, in accordance with an embodiment of the disclosure.

FIG. 3 is a diagram illustrating an exemplary integrated user interface (UI) for electronic devices, in accordance with an embodiment of the disclosure. FIG. 3 is explained in conjunction with elements from FIG. 1 and FIG. 2. With reference to FIG. 3, there is shown an integrated UI 300 that may be rendered on the first electronic device 102a. The integrated UI 300 may comprise a vertical bar and a horizontal bar. The horizontal bar may include icons for one or more electronic devices 102, which communicate with each other via the first communication network 106. In an embodiment, the one or more electronic devices 102 may communicate with each other directly, or via the server 110 over the second communication network 108.

As shown in the integrated UI 300, the horizontal bar may display icons for the first electronic device 102a, the second electronic device 102b, and the third electronic device 102c. The vertical bar of the integrated UI 300 may display an integrated set of UI elements corresponding to the first electronic device 102a. The integrated set of UI elements may comprise settings menu item 302a, applications menu item 304a, images menu item 306a, music menu item 308a, videos menu item 310a, movies menu item 312a, messages/mail menu item 314a, and/or games menu item 316a. The integrated UI 300 may comprise a back button menu item 318, to revert to the original UI of the first electronic device 102a. The first electronic device 102a may receive metadata from the second electronic device 102b, and the third electronic device 102c. The first electronic device 102a, the second electronic device 102b, and the third electronic device 102c, may communicate and/or interact with each other via the first communication network 106. In an embodiment, the first communication network 106 may be a home network.

In FIG. 3, the first electronic device 102a may generate an integrated UI on a display of the first electronic device 102a. In an embodiment, the integrated UI 300 may be rendered on a display of the first electronic device 102a. Notwithstanding, the integrated UI 300 may be generated by the server 110, and rendered on the second electronic device 102b, or the third electronic device 102c, without deviating from the scope of the disclosure. In an embodiment, the first electronic device 102a may execute the functionality of the server 110.

The integrated UI 300 may allow a user to view a display of the first electronic device 102a, that shows one or more integrated set of menu items of the integrated UI 300. An icon that corresponds to one of the one or more electronic devices 102, displayed on the horizontal bar, may be selected. The icon may be selected based on an electronic device to be controlled. In an embodiment, the icon corresponding to the first electronic device 102a may be selected to control the first electronic device 102a. The icon that corresponds to the electronic device 102a may be selected by utilizing button(s) on the first remote controller 104a, associated with the first electronic device 102a. In an embodiment, when the user hovers/moves a cursor on an icon of the first electronic device 102a, shown on the horizontal bar of the integrated UI 300, a drop-down list of menu items of the first electronic device 102a may be shown. The drop-down list may include a current set of available operations associated with a set of features of the first electronic device 102a. Similarly, the user may select other electronic devices 102b-102c on the horizontal bar such that menu items that correspond to the selected electronic device may be displayed. The respective icons may be selected by utilizing button(s) on the first remote controller 104a.

In an embodiment, the one or more menu items of each of the one or more electronic devices 102, displayed on the horizontal bar of the integrated UI 300, may be populated based on respective user interfaces of each of the one or more electronic devices 102. For instance, the second electronic device 102b may transmit a portion of menu items of a user interface of the second electronic device 102b, to the first electronic device 102a, via the first communication network 106. In such a case, the first electronic device 102a may display the portion of menu items on a drop down list of one or more menu items that correspond to the second electronic device 102b.

In an embodiment, the first electronic device 102a, which generates the integrated UI 300, may select the one or more menu items on a drop down list of each of the one or more electronic devices 102. The one or more menu items from respective drop down lists of each of the one or more electronic devices 102 may be selected based on a set of features of each of the one or more electronic devices 102. For instance, the third electronic device 102c may be a game console and the first electronic device 102a may be a television. The television rendering the integrated UI 300 may identify that the third electronic device 102c, is the game console with a set of features, such as the type of game console and its associated hardware and/or software capabilities, one or more third-party service accounts associated with a user of the game console, content such as movies being stored on a memory of the game console, and/or the like. The television may display the one or menu items of the game console based on features available on the game console. In an embodiment, the hardware capabilities of the first electronic device 102a may correspond to a current version of hardware, such as a processor, a memory, a monitor, a disk drive, a video card, a sound card, a network adapter, a modem, a USB port, a keyboard (or input device), and/or a speaker. In an embodiment, the software capabilities of the first electronic device 102a may correspond to a software running on the first electronic device 102a, such as a set of features provided by a current version of an operating system implemented on the first electronic device 102a. The set of features provided by the operating system may include, but are not limited to, a screen resolution, an audio playback, a video playback, an image sharing, a third-party service associated with a user of the first electronic device 102a, a backup and storage, and/or a specific feature associated with various updates in software versions.

As shown in the integrated UI 300, when the user selects the first electronic device 102a on the horizontal bar, the one or menu items may be displayed in the drop-down list. The settings menu item 302a in the drop-down list may include a plurality of controllable functions of the first electronic device 102a. The controllable functions may include an input mode, a display setting, a sound level, a language preference, a volume level, a gesture control, a location, an associated network, a power level, date information, and/or time information.

The applications menu item 304a may include a plurality of applications available on the first electronic device 102a. The plurality of applications may include applications downloadable on the first electronic device 102a from a plurality of sources, such as an online content store provided by a manufacturer of the first electronic device 102a or freely available on the Internet. The plurality of applications may include applications related to videos, music, movies, content streaming, video calling, instant messaging, chats, broadcast content on one or more channels, event coverage, news, interviews, favorite game-based content, trailers, live-streaming, social media websites, storage, and/or the like.

The images menu item 306a may include one or more photographs and/or images stored in the memory 204 of the first electronic device 102a. The one or more images may be transferred to the first electronic device 102a, via one or more peripheral devices attached to the first electronic device 102a. The one or more peripheral devices may include a removable disk and/or USB drive. In an embodiment, the images menu item 306a may include images downloaded from the Internet. In an embodiment, the images 306a may include thumbnails of the content streamed on the first electronic device 102a. In an embodiment, the images menu item 306a may include snapshots captured from accessing various content streaming and/or live-streaming applications via applications menu item 304a.

The music menu item 308a may include a plurality of audio files stored on the memory 204 of the first electronic device 102a. The plurality of audio files may be transferred to the first electronic device 102a, via one or more peripheral devices attached to the first electronic device 102a. The one or more peripheral devices may include a removable disk and/or USB drive. In an embodiment, the music menu item 308a may include audio files downloaded from the Internet. In an embodiment, the audio files may be saved by accessing an audio-related application via applications menu item 304a. In an embodiment, the music menu item 308a may include audio files included in a catalog of a user's library and/or subscription. For example, a user may subscribe to an on-demand streaming music service such as Music Unlimited™ and may have an access to over millions of audio files. Such audio files available from user's online subscription to one or more streaming services may serve as metadata available to the integrated UI 300 for usage via streaming. Examples of online music streaming services may include Pandora™, Slacker™, Spotify™, and/or the like.

The videos menu item 310a may include a plurality of video clips stored on the memory 204 of the first electronic device 102a. The plurality of video clips may be transferred to the first electronic device 102a, via one or more peripheral devices connected to the first electronic device 102a. The one or more peripheral devices may include a removable disk and/or USB drive. In an embodiment, the videos menu item 310a may include video clips downloaded from the Internet. In an embodiment, the plurality of video clips may be saved from accessing video-based applications via applications menu item 304a. In an embodiment, the plurality of video clips may be saved from content being streamed on the display of the first electronic device 102a. In an embodiment, the plurality of video clips may include videos captured on a video capturing device.

The movies menu item 312a may include a plurality of movie clips stored in the memory 204 of the first electronic device 102a. The plurality of movie clips may be transferred to the first electronic device 102a, via one or more peripheral devices attached to the first electronic device 102a. The one or more peripheral devices may include a removable disk and/or USB drive. In an embodiment, the movies menu item 312a may include movie clips downloaded from the Internet. In an embodiment, a plurality of movie clips may be saved from content streaming and/or movie accessing applications via applications menu item 304a.

The messages/mail menu item 314a may include a plurality of messages and mails received by the first electronic device 102a, and stored in the memory 204. In an embodiment, the plurality of messages may be received from a content provider associated with the first electronic device 102a. The plurality of messages may relate to subscriptions, new plans, updates, reminders, billing, and/or the like. In an embodiment, the plurality of messages may be related to applications accessed from the applications menu item 304a. The plurality of mails may include mail received from one or more user accounts associated with the first electronic device 102a. In an embodiment, the plurality of mails may be received from one or more email services, via the first communication network 106. In an embodiment, the plurality of mails may be saved in messages/mail menu item 314a, on the memory of the first electronic device 102a, by accessing email related applications from available third-party services or applications menu item 304a.

The games menu item 316a may include a plurality of games stored on the memory 204 of the first electronic device 102a. The plurality of games may be available from various game providers. In an embodiment, the plurality of games may be available with a user subscription plan associated with the first electronic device 102a. In an embodiment, the plurality of games may be accessed and played through game-related applications from the applications menu item 304a. The plurality of games may be transferred to the first electronic device 102a, via one or more peripheral devices attached to the first electronic device 102a. The one or more peripheral devices may include a removable disk and/or USB drive.

The back button menu item 318 may include a graphical icon on the integrated UI 300, to perform a specified function. When a user selects the back button menu item 318 by pressing button(s) on the first remote controller 104a, the first electronic device 102a may switch the integrated UI 300 back to the original UI of the first electronic device 102a.

In an embodiment, the integrated UI 300 may include an integrated set of menu items. The integrated set of menu items may include a first portion of a first set of menu items of UI of the first electronic device 102a, a second portion of a second set of menu items of UI of the second electronic device 102b, and so forth. In an embodiment, the integrated set of menu items may include one or more menu items displayed in the vertical bars of the integrated UI 300, which corresponds to the first electronic device 102a, the second electronic device 102b, and the third electronic device 102c. In an embodiment, the integrated set of menu items comprising one or more menu items from the one or more electronic devices 102 may be grouped and/or ordered based on respective one or more functionalities of each of the one or more electronic devices 102. For example, one or more menu items from a first group of electronic devices in the one or more electronic devices 102 that effect sound may be grouped together and displayed together on the integrated UI 300. Similarly, one or more menu items from a second group of electronic devices in the one or more electronic devices 102 that effect video may be grouped together in a different location on the integrated UI 300. Such one or more menu items from first and second group of electronic devices may be displayed in a distinguished manner to enable a user to readily identify electronic devices with similar functionalities. In an embodiment, one of the one or more electronic devices 102 that renders and/or generates the integrated UI 300 may decide the grouping and/or ordering of the one or more electronic devices 102 based on one or more functionalities of each of the one or more electronic devices 102.

In an embodiment, the integrated set of menu items on the integrated UI 300 may be selected to be displayed, based on a set of features of the first electronic device 102a, the second electronic device 102b, and the third electronic device 102c. In an embodiment, in the network environment 100, the first electronic device 102a may be a non-display device. The second electronic device 102b and the third electronic device 102c may be display devices. The second electronic device 102b may generate the integrated UI 300, based on metadata received from the first electronic device 102a, and the third electronic device 102c. The second electronic device 102b may determine the menu items of the first electronic device 102a, and third electronic device 102c, to be displayed on the integrated UI 300. In an embodiment, one of the second electronic device 102b and the third electronic device 102c, may be selected to render the integrated UI 300. The selected one may be determined by the second electronic device 102b that generates the integrated UI 300, based on one or more functionalities of each of the second electronic device 102b and the third electronic device 102c, respectively. In an embodiment, the second electronic device 102b may generate the integrated UI 300 and may render the display of the integrated UI 300. In an exemplary scenario, the second electronic device 102b may be a television and the third electronic device 102c may be a mobile device. A user may use the television for watching a movie for a time period. However, the mobile device may be idle from its usual operations, such as voice call, chats, and the like. In such an exemplary scenario, the television may generate the integrated UI 300 and determine that the mobile device may be utilized to render the integrated UI 300.

In an embodiment, the one or more electronic devices 102, may have the capability to communicate with other electronic devices in the first communication network 106. In an embodiment, the one or more electronic devices 102 may negotiate to select an optimum device to render the integrated UI 300, based on one or more features of each electronic device. In an embodiment, each of the one or more electronic devices 102 may identify an operation state, such as an idle state or a busy state, of each electronic device.

In an embodiment, one or more preferences of a user associated with the first electronic device 102a may be analyzed over a period of time. The user preferences may include favorite channels, favorite movies, frequently used display settings, volume settings, and/or the like.

In an embodiment, the user preferences may comprise a list of preferred sub-menu items of the at least one menu item of the integrated set of menu items on the integrated UI 300. For instance, while watching a movie on the first electronic device 102a, the user may prefer sub-menu items such as, a set brightness level or a set volume. The sub-menu items may be included in the settings menu item 302a on the integrated UI 300. The first electronic device 102a may generate the integrated UI based on such preferences.

In an embodiment, the first electronic device 102a that generates the integrated UI 300 may analyze a history of user actions. The history of user actions may include navigation through and/or selection of menu items of the integrated UI 300, via button(s) on a remote controller, such as the first remote controller 104a, associated with the first electronic device 102a. For example, more frequently used menu items are placed at the top of the menu items of the integrated UI 300. As the users of the first electronic device 102a use the UI, the first electronic device 102a may adjust placement and structure of the more frequently used menu items to reflect the use patterns. In an embodiment, one or more menu items in the integrated set of menu items, used below a threshold in the integrated UI 300, may be excluded from being displayed as a part of the integrated UI 300. In an embodiment, the integrated set of menu items on the integrated UI 300 utilized by a user may be stored in relation to a user profile.

In an embodiment, the integrated UI 300 may be updated dynamically based on the user's preferences and history of using one or more integrated set of menu items in the integrated UI 300. In an embodiment, a plurality of users may use the first electronic device 102a to generate the integrated UI 300. Each user may have a different set of preferences and a different historical usage of the integrated set of menu items. In an embodiment, the first electronic device 102a may identify each user by presence, login credentials, user activity, and/or the like. In an embodiment, the first electronic device 102a may store unique user profile preferences and historical usage of integrated set of menu items of the integrated UI 300. The user profiles may be retrieved to extract information related to each user, in order to generate or dynamically update the rendered integrated UI 300.

In an embodiment, the integrated UI 300 may be updated, based on a connection status of each of the one or more electronic devices 102 that communicate with each other over the first communication network 106. The integrated UI 300 may be dynamically updated to reflect an electronic device that adds itself to the first communication network 106. In such a case, the horizontal bar of the integrated UI 300 may be updated to reflect the newly added electronic device. Notwithstanding, the newly added electronic device may be highlighted to gain user attention through various means known in the art. In an embodiment, when an electronic device is disconnected from the first communication network 106, the horizontal bar of the integrated UI 300 may be updated to reflect only those one or more electronic devices 102 that are currently in communication with the first communication network 106.

In an embodiment, one or more electronic devices 102b-102c that transmit data to the first electronic device 102a, that generates the integrated UI 300, may not be in a power on/operation state. In such a case, the first electronic device 102a may detect a connection status of such turned-off devices, based on the last communication from those devices. In an embodiment, the first remote controller 104a may be utilized to control one or more features of the first electronic device 102a. In an embodiment, the first remote controller 104a may be utilized to control one or more features of one or more electronic devices 102 which communicate with the first electronic device 102a that generates the integrated UI 300. In an embodiment, the first remote controller 104a may be utilized to control one or more features of the second electronic device 102b and the third electronic device 102c. The first remote controller 104a may be used to control the functionalities of the one or more electronic devices 102 associated with respective features and a current set of available operations, via the integrated UI 300. In an embodiment, the first remote controller 104a may control one or more features of the second electronic device 102b, and/or the third electronic device 102c, by pressing button(s) on the first remote controller 104a.

In an embodiment, button(s) on the first remote controller 104a may be pressed to generate commands to control one or more functions associated with one or more features of the second electronic device 102b, and/or the third electronic device 102c. The commands that correspond to the one or more button presses may be relayed to the respective electronic device controlled such that a desired function is performed. In such a case, the respective electronic device is controlled based on selection of the one or more menu items that correspond to the respective electronic device on the horizontal bar of the integrated UI 300. In other words, the first electronic device 102a communicates the navigation/selection on the integrated UI 300 to the respective controlled electronic device. In an embodiment, the controlled electronic device may be determined based on predetermined criteria and/or negotiation among the one or more electronic devices 102.

In an embodiment, the one or more electronic devices 102, involved in generation of the integrated UI 300, may be controlled by the integrated UI 300 and the first remote controller 104a. However, if a feature to be controlled by the first remote controller 104a is common to the one or more electronic devices 102, the user that operates the first remote controller 104a may not be aware of which electronic device is controlled. In order to make the user aware of the controlled electronic device, the integrated UI 300 highlights the icon that corresponds to the controlled electronic device. The one or more features of controlled electronic device may be highlighted in the horizontal bar of the integrated UI 300. The icon may be highlighted by such as bolding, underlining, glowing, changing color and/or font of the icon, flashing, and/or other means known in the art. In an embodiment, highlighting the icon for the controlled electronic device on the horizontal bar of the integrated UI 300 may be auditory, visual, or both. For instance, the first electronic device 102a is a television, the second electronic device 102b is a Blu-ray Disc™ player, and the third electronic device 102c is a game console. The one or more electronic devices 102 share a common feature, such as volume control. In such a case, when the integrated UI 300 is rendered on the television, the electronic device controlled for volume adjustment may be highlighted in the horizontal bar.

In an embodiment, the second electronic device 102b may be connected to an external port of the first electronic device 102a. The first electronic device 102a that renders the integrated UI 300, may control one or more features of the first electronic device 102a, based on the type of the second electronic device 102b. For instance, the first electronic device 102a may be a television, and the second electronic device 102b may be a home theater receiver that derives input from the television. The television may forward one or more commands for volume and/or muting from the first remote controller 104a to the home theater receiver. However, if the television is not connected to the home theater receiver and/or the home theater receiver does not derive input from the television, the television may route volume and/or muting commands to control internal speakers of the television. In an embodiment, the first electronic device 102a, such as a television, may detect a common control command among the one or more electronic devices 102, such as home theater receiver, connected to the first electronic device 102a. The first electronic device 102a may automatically control a functionality of hardware components, such as internal speakers, based on the detected common control command.

In an embodiment, the second electronic device 102b may be synchronized with a language setting of the first electronic device 102a. The second electronic device 102b may switch from one language to another language associated with the first electronic device 102a. For instance, the first electronic device 102a is a television with Spanish as a default language, and the second electronic device 102b is a Blu-ray Disc™ player with English as a default language. When the Blu-ray Disc™ player is connected to an external port of the television, the default language of the Blu-ray Disc™ player may be set to Spanish. In such a case, if the language of the television is switched to English, the default language of the Blu-ray Disc™ player is also set to English.

In an embodiment, when a second electronic device 102b is connected to an external port of the first electronic device 102a, such that the first electronic device 102a generates and renders the integrated UI 300, the first electronic device 102a may send a menu launch command to the second electronic device 102b. In such a case, the first electronic device 102a may display a screen to switch input and forward commands from the first remote controller 104a, to the second electronic device 102b.

Figure 4:
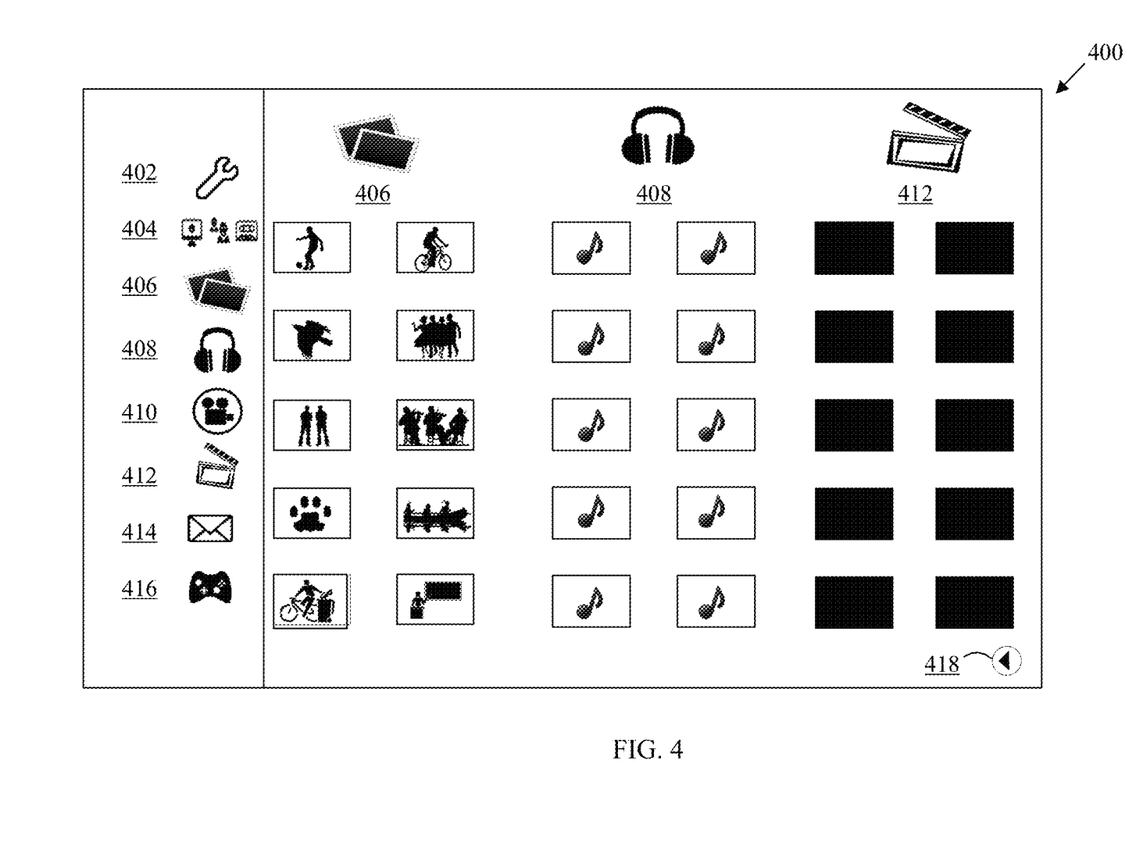
FIG. 4 is a diagram illustrating another exemplary integrated UI for electronic devices, in accordance with an embodiment of the disclosure.

FIG. 4 is a diagram illustrating another integrated user interface (UI) for electronic devices in accordance with an embodiment of the disclosure. FIG. 4 is described in conjunction with elements of FIG. 1, FIG. 2 and FIG. 3. With reference to FIG. 4, there is shown an integrated UI 400 rendered at the first electronic device 102a. The integrated UI comprises a side bar, similar to the vertical bar (302a-318a) shown in FIG. 3, and a main screen. However, the menu items included in the side bar are common to a one or more electronic devices 102 communicating with each other via the first communication network 106. In an embodiment, the one or more electronic devices 102 may communicate with each other via the server 110, over the second communication network 108.

FIG. 4 differs from FIG. 3 in a manner in which the content and menu items are presented and the placement of various icons on the layout of integrated UI 400. The side bar comprises a plurality of menu items. The plurality of icons comprises settings 402, applications 404, images 406, music 408, videos 410, movies 412, messages/mails 414, games 416 and back button 418. The main display includes sub-menu items of the plurality of menu items described above in an aggregated view. As shown in FIG. 4, the sub-menu items that correspond to images 406, music 408, and movies 412 has been shown. The integrated UI 400 displays an integrated interface based on the one or more electronic devices 102 that communicate with each other. The first electronic device 102a may generate the integrated UI 400, and render the integrated UI 400 on a display.

With reference to FIG. 1, the first electronic device 102a receives metadata from the second electronic device 102b, and the third electronic device 102c. The first electronic device 102a generates the integrated UI 400 in such a way that the UI 400 appears unified to a user of the first electronic device 102a. The content comprises settings, applications, images, audio files, video clips, movies, messages/mails, and/or games. The content may be aggregated from the first electronic device 102a, the second electronic device 102b, and the third electronic device 102c, and presented to the user on the integrated UI 400. The functions of each of the icons on the side bar are similar to the plurality of icons on the vertical bar of the integrated UI 300, and hence, the detailed explanation has been omitted in the present embodiment. The function of the back button 418 is similar to the back button 318 described in detail in FIG. 3.

As shown in FIG. 4, the integrated UI 400 may appear as a repository of content, such that the user may select an icon on the side bar from the plurality of icons. In response to the selection of an icon by the user on the integrated UI 400, an aggregated view of the selected icon may be displayed on a main display. In an embodiment, the user may query the integrated UI 400 to search for a content item of interest, such as a favorite movie. The integrated UI 400 may respond to the query by displaying the search results in a condensed manner. In an embodiment, the integrated UI 400 may display content items that are close to the search criteria and/or match the searched criteria to an extent. The matching criteria may be determined based on database query algorithms known in the art.

Figure 5:
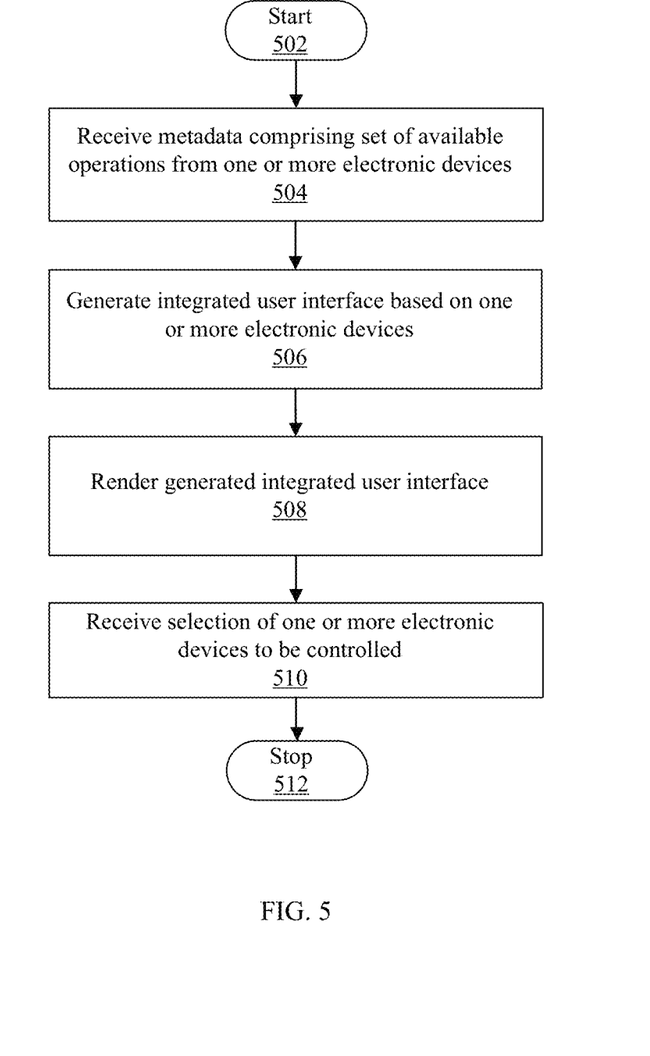
FIG. 5 is a flow chart illustrating exemplary steps for integrated UI for electronic devices, in accordance with an embodiment of the disclosure.

FIG. 5 is a flow chart illustrating exemplary steps for integrated user interface (UI) for the one or more electronic devices 102, in accordance with an embodiment of the disclosure. FIG. 4 is described in conjunction with elements of FIG. 1, FIG. 2 and FIG. 3. The method 500 may be implemented in one of one or more electronic devices 102a, which may communicate with the one or more electronic devices 102b and 102c, directly or via the first communication network 106. In an embodiment, the method 500 may be implemented in the one of the one or more electronic devices 102a, which may be communicatively coupled to the server 110, via the second communication network 108.

The method 500 begins at step 502 and proceeds to step 504. At step 504, metadata is received at one of the one or more electronic devices 102a, from the one or more electronic devices 102b and 102c. At step 506, based on the received metadata, an integrated UI that corresponds to the one or more electronic devices 102, may be generated.

At step 508, the generated integrated UI may be rendered at a display of one of the one or more electronic devices 102a. Accordingly, an integrated UI, similar to the integrated UI 300 shown in FIG. 3, may be displayed on the first electronic device 102a. In an embodiment, an integrated UI, similar to the integrated UI 400 shown in FIG. 4, may be displayed on the first electronic device 102a.

At step 510, based on the rendered integrated UI, the electronic device 102a may receive selection of one or more electronic devices 102 to be controlled. In an embodiment, the electronic device to be controlled may be selected by a user by the generation of commands from the first remote controller 104a. Control then passes to end step 512.

In accordance with an embodiment of the disclosure, a first electronic device 102a (FIG. 2) for rendering an integrated user interface (UI) is disclosed. Each electronic device in one or more electronic devices 102 is connected to the first communication network 106 (FIG. 1). Exemplary aspects of the disclosure may comprise one or more processors and/or circuits, such as the processor 202 (FIG. 2), in the first electronic device 102a (FIG. 1). The processor 202 may be operable to receive metadata from a second electronic device 102b (FIG. 1) and/or the third electronic device 102c. The processor 202 may be operable to generate an integrated UI that corresponds to the one or more electronic devices 102. The received metadata may comprise a current set of available operations for controlling the one or more electronic devices 102. The processor 202 may render the generated integrated UI on a display of the first electronic device 102a.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for integrated user interface for electronic devices. The at least one code section in one of one or more electronic devices 102a, may cause the machine and/or computer to perform the steps that comprise a receipt of metadata from the one or more electronic devices 102. The one of one or more electronic devices 102a generates an integrated user interface that corresponds to the one or more electronic devices 102, based on the received metadata. The received metadata comprises a current set of available operations to control the one or more electronic devices 102. The one of one or more electronic devices 102a renders the generated integrated UI on the one of one or more electronic devices 102a.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means an expression, in a specified language, code or notation, of a set of instructions intended to cause a system having an information processing capability to perform a particular function either directly, or after either or both of the following a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to, the particular embodiment disclosed, but that the present disclosure will include all embodiments falling within the scope of the appended claims.

What is claimed is:
1. A system, comprising:
  at least one processor in a first electronic device of a first plurality of electronic devices, said at least one processor is configured to:
    receive metadata from a second electronic device of said first plurality of electronic devices;

generate an integrated user interface (UI) corresponding to said first plurality of electronic devices based on said received metadata, wherein said received metadata comprises a set of available operations to control said second electronic device of said first plurality of electronic devices;

determine a functionality of each of said first plurality of electronic devices, wherein said determined functionality corresponds to one of a display function or a non-display function;

determine a second plurality of electronic devices from said first plurality of electronic devices based on said determined functionality of each of said first plurality of electronic devices, wherein each of said determined second plurality of electronic devices comprises said display function;

select an optimum electronic device from said determined second plurality of electronic devices based on an operation state of said determined second plurality of electronic devices,
wherein said operation state corresponds to one of an idle state or a busy state of said determined second plurality of electronic devices;

render said generated integrated UI on said selected optimum electronic device based on said operation state; and control a layout of a first set of UI elements corresponding to said second electronic device on said rendered integrated UI based on a historical usage of said first set of UI elements.

2. The system of claim 1, wherein said integrated UI comprises said first set of UI elements corresponding to said first plurality of electronic devices based on said received metadata.

3. The system of claim 1, wherein said at least one processor is further configured to render said integrated UI on said determined second plurality of electronic devices.

4. The system of claim 3, wherein said at least one processor is further configured to control a feature associated with said set of available operations of said second electronic device, via said rendered integrated UI on said determined second plurality of electronic devices.

5. The system of claim 3, wherein
said rendered integrated UI comprises at least one UI corresponding to a third electronic device of said first plurality of electronic devices, and
said at least one UI comprises a second set of UI elements corresponding to said third electronic device of said first plurality of electronic devices.

6. The system of claim 3, wherein
said rendered integrated UI comprises a first UI corresponding to said second electronic device and at least one second UI corresponding to a third electronic device of said first plurality of electronic devices, and
said first UI comprises first set of UI elements corresponding to said second electronic device and said at least one second UI comprises a second set of UI elements corresponding to said third electronic device.

7. The system of claim 6, wherein said rendered integrated UI corresponding to said second electronic device comprises an integrated set of UI elements, and
said integrated set of UI elements comprises a portion of said first set of UI elements and a portion of said second set of UI elements.

8. The system of claim 7, wherein said integrated set of UI elements is selected based on a set of features of said second electronic device and a set of features of said third electronic device.

9. The system of claim 8, wherein said set of features of said second electronic device corresponds to at least one of a hardware capability or a software capability of said second electronic device, and said set of features of said third electronic device corresponds to at least one of a hardware capability or a software capability of said third electronic device.

10. The system of claim 7, wherein said integrated set of UI elements is dynamically updated based on at least one of user preferences or a historical usage of said integrated set of UI elements.

11. The system of claim 10, wherein said user preferences comprise at least one of at least one feature of a first set of features, at least one feature of a second set of features, at least one UI element of said first set of UI elements, or at least one UI element of said second set of UI elements.

12. The system of claim 10, wherein said historical usage of said integrated set of UI elements comprises at least one frequently used UI element of said integrated set of UI elements over a period of time.

13. The system of claim 10, wherein said metadata further comprises at least one of said portion of said second set of UI elements, a set of features corresponding to said third electronic device, settings of said third electronic device, at least one operating condition of said third electronic device, said user preferences, or said historical usage of said integrated set of UI elements.

14. The system of claim 1, wherein said at least one processor is further configured to transmit said integrated UI to a third electronic device of said first plurality of electronic devices via a communication network.

15. The system of claim 14, wherein said at least one processor is further configured to dynamically update said integrated UI based on a connection status of each of said first plurality of electronic devices in said communication network.

16. A system, comprising:
a server communicatively coupled to a first plurality of electronic devices comprising a first electronic device and a second electronic device, said server comprising at least one first processor configured to:
receive metadata from said second electronic device of said first plurality of electronic devices; and
generate an integrated user interface (UI) corresponding to said first plurality of electronic devices based on said received metadata, wherein said received metadata comprises a set of available operations to control said second electronic device of said first plurality of electronic devices; and
at least one second processor in said first electronic device is configured to:
determine a functionality of each of said first plurality of electronic devices, wherein said determined functionality corresponds to one of a display function or a non-display function;
determine a second plurality of electronic devices from said first plurality of electronic devices based on said determined functionality of each of said first plurality of electronic devices, wherein each of said determined second plurality of electronic devices comprises said display function;
select an optimum electronic device from said determined second plurality of electronic devices based on an operation state of said determined second plurality of electronic devices,
  wherein said operation state corresponds to one of an idle state or a busy state of said determined second plurality of electronic devices;
render said generated integrated UI on said selected optimum electronic device based on said operation state; and
control a layout of a set of UI elements corresponding to said second electronic device on said rendered integrated UI based on a historical usage of said set of UI elements.

17. The system of claim 16, wherein said first plurality of electronic devices is communicatively interconnected via a communication network.

18. The system of claim 16, wherein said server is configured to communicate with said first plurality of electronic devices via a communication network.

19. A method, comprising:
receiving metadata from an electronic device of a first plurality of electronic devices;
generating an integrated user interface (UI) corresponding to said first plurality of electronic devices based on said received metadata, wherein said received metadata comprises a set of available operations for controlling said electronic device;
determining a functionality of each of said first plurality of electronic devices, wherein said determined functionality corresponds to one of a display function or a non-display function;
determining a second plurality of electronic devices from said first plurality of electronic devices based on said determined functionality of each of said first plurality of electronic devices, wherein each of said determined second plurality of electronic devices comprises said display function;
selecting an optimum electronic device from said determined second plurality of electronic devices based on an operation state of said determined second plurality of electronic devices,
  wherein said operation state corresponds to one of an idle state or a busy state of said determined second plurality of electronic devices;
rendering said generated integrated UI on said selected optimum electronic device based on said operation state; and
controlling a layout of a set of UI elements corresponding to said electronic device on said rendered integrated UI based on a historical usage of said set of UI elements.

20. A non-transitory computer-readable medium having stored thereon computer-executable instructions that, when executed by a computer, cause said computer to execute operations, said operations comprising:
receiving metadata from an electronic device of a first plurality of electronic devices;
generating an integrated user interface (UI) corresponding to said first plurality of electronic devices based on said received metadata, wherein said received metadata comprises a set of available operations for controlling said electronic device;
determining a functionality of each of said first plurality of electronic devices, wherein said determined functionality corresponds to one of a display function or a non-display function;
determining a second plurality of electronic devices from said first plurality of electronic devices based on said determined functionality of each of said first plurality of electronic devices, wherein each of said determined second plurality of electronic devices comprises said display function;
selecting an optimum electronic device from said determined second plurality of electronic devices based on an operation state of said determined second plurality of electronic devices,
  wherein said operation state corresponds to one of an idle state or a busy state of said determined second plurality of electronic devices;
rendering said generated integrated UI on said selected optimum electronic device based on said operation state; and
controlling a layout of a set of UI elements corresponding to said electronic device on said rendered integrated UI based on a historical usage of said set of UI elements.

* * * * *